(12) United States Patent
Koyama et al.

(10) Patent No.: US 10,351,056 B2
(45) Date of Patent: Jul. 16, 2019

(54) ILLUMINATION DEVICE (71) Applicant: NIFCO INC., Yokosuka-shi, Kanagawa (JP)

(72) Inventors: Sachiko Koyama, Yokosuka (JP); Taeko Ueno, Yokosuka (JP)

(73) Assignee: NIFCO INC., Yokosuka-Shi, Kanagawa (JP)

( * ) Notice: Subject to any disclaimer, the term of this patent is extended or adjusted under 35 U.S.C. 154(b) by 556 days.

(21) Appl. No.: 14/916,451

(22) PCT Filed: Sep. 9, 2014

(86) PCT No.: PCT/JP2014/073824
§ 371 (c)(1),
(2) Date: Mar. 3, 2016

(87) PCT Pub. No.: WO2015/041104
PCT Pub. Date: Mar. 26, 2015

(65) Prior Publication Data
US 2016/0195661 A1    Jul. 7, 2016

(30) Foreign Application Priority Data

Sep. 18, 2013  (JP) .................................. 2013-193367

(51) Int. Cl.
*B60Q 3/64* (2017.01)
*B60Q 3/20* (2017.01)
*F21V 8/00* (2006.01)

(52) U.S. Cl.
CPC ................. *B60Q 3/64* (2017.02); *B60Q 3/20* (2017.02); *G02B 6/001* (2013.01); *G02B 6/0018* (2013.01)

(58) Field of Classification Search
CPC ............. G02B 6/001; B60Q 3/20; B60Q 3/64
See application file for complete search history.

(56) References Cited

U.S. PATENT DOCUMENTS 7,127,163 B2 * 10/2006 Lee ...................... G02B 6/0038
396/198
7,246,931 B2   7/2007 Hsieh et al.
(Continued)

FOREIGN PATENT DOCUMENTS

CN   102109129 A   6/2011
CN   102576116 A   7/2012
(Continued)

OTHER PUBLICATIONS

China Patent Office, "Office Action for Chinese Patent Application No. 201480051196.5," dated Jan. 29, 2018.
(Continued)

*Primary Examiner* — Robert J May
*Assistant Examiner* — Leah Simone Macchiarolo
(74) *Attorney, Agent, or Firm* — Manabu Kanesaka (57) ABSTRACT

An illumination device includes a light-guide member having an annular shape provided with an incidence portion of a light in one portion, and illuminating the entirety by propagating an incident light; and a diffusion cover disposed on a side opposite to a light source relative to the incidence portion by interposing the light-guide member therebetween, and diffusing a light generated from the light-guide member. The diffusion cover includes a plate-shaped base portion covering the incidence portion side in the light-guide member, and a circular portion covering the remaining portions of the light-guide member by integrating an outer peripheral portion into the plate-shaped base portion.

10 Claims, 8 Drawing Sheets

(56) References Cited

U.S. PATENT DOCUMENTS

| | | | | |
|---|---|---|---|---|
| 7,500,443 B1* | 3/2009 | Allen | ................... | B63B 29/06 |
| | | | | 114/343 |
| 9,933,130 B2* | 4/2018 | Umeda | ................... | F21V 5/002 |
| 2004/0066659 A1* | 4/2004 | Mezei | ................... | G02B 6/001 |
| | | | | 362/555 |
| 2007/0247836 A1* | 10/2007 | Seidl | ................... | A47C 7/725 |
| | | | | 362/154 |
| 2008/0266853 A1 | 10/2008 | Goto | | |
| 2009/0238527 A1* | 9/2009 | Zyka | ................... | G02B 5/045 |
| | | | | 385/129 |
| 2010/0315826 A1 | 12/2010 | Anderson et al. | | |
| 2011/0261579 A1* | 10/2011 | Anderson | ............ | B60N 3/108 |
| | | | | 362/551 |
| 2013/0137923 A1 | 5/2013 | Honda et al. | | |
| 2013/0258670 A1* | 10/2013 | Abro | ................... | B60N 3/101 |
| | | | | 362/253 |
| 2015/0191116 A1* | 7/2015 | Forrest | ................ | B60N 3/101 |
| | | | | 362/516 |
| 2015/0253481 A1* | 9/2015 | Sakanashi | ............. | B60N 3/10 |
| | | | | 362/611 |
| 2015/0291090 A1* | 10/2015 | Koizumi | ............. | B60N 3/101 |
| | | | | 362/511 |
| 2015/0291092 A1* | 10/2015 | Nirei | ................... | G01D 11/28 |
| | | | | 362/511 |

FOREIGN PATENT DOCUMENTS

| | | | | |
|---|---|---|---|---|
| CN | 103257392 A | | 8/2013 | |
| DE | 102005035282 A1 | | 2/2007 | |
| EP | 0736415 A1 | | 10/1996 | |
| JP | 2004-134223 A | | 4/2004 | |
| JP | 2005-178497 A | | 7/2005 | |
| JP | 2005-329753 A | | 12/2005 | |
| JP | 2010-132201 A | | 6/2010 | |
| TW | 200619744 A | | 6/2006 | |
| WO | WO 2007006241 A2 * | | 1/2007 | ............. G03B 15/05 |

OTHER PUBLICATIONS

Europe Patent Office, "Search Report for European Patent Application No. 14846005.8," dated Apr. 19, 2017.

Korea Patent Office, "Office Action for Korean Patent Application No. 10-2014-0116285," dated Jan. 20, 2016.

Taiwan Patent Office, "Office Action for Taiwanese Patent Application No. 103129819," dated Feb. 3, 2016.

* cited by examiner

ID DEVICE

FIELD OF TECHNOLOGY

The present invention relates to an improvement of an illumination device including a light-guide member having an annular shape to form an annular luminescent portion in one portion of various articles by the light-guide member.

BACKGROUND ART

As for an illumination device which emits a ring-shaped light by an incident light from a point-like light source, there is an illumination device shown in Patent Document 1.

However, in a case wherein a light is simply entered into the light-guide member having an annular shape from one portion to illuminate the entirety of the light-guide member, an incidence portion side brightens up, so that the entirety of the light-guide member cannot be uniformly illuminated.

PRIOR ART DOCUMENT

Patent Document

Patent Document 1: Japanese Unexamined Patent Application Publication No. 2003-297108

SUMMARY OF THE INVENTION

Problems to Be Solved by the Invention

A main object of the present invention is to provide an annular luminescent device which forms the annular luminescent portion by a light-guide member having an annular shape by entering the light into the light-guide member from one portion, wherein a difference in brightness between the incidence portion side of the light and the other portions is reduced as little as possible.

Means for Solving the Problems

In order to obtain the aforementioned object, in the present invention, an illumination device comprises a light-guide member having an annular shape provided with an incidence portion of a light in one portion to illuminate the entirety by propagating an incident light; and a diffusion cover disposed on a side different from a light source side relative to the incidence portion to diffuse the light generated from the light-guide member. The diffusion cover includes a plate-shaped base portion covering the incidence portion side in the light-guide member; and a circular portion covering the remaining portion of the light-guide member by integrating an outer peripheral portion into the plate-shaped base portion.

According to the diffusion cover, the light on the incidence portion side is effectively diffused, so that the circular portion of the diffusion cover can be illuminated with uniform brightness as much as possible in any position thereof.

In one of preferred aspects of the present invention, the circular portion of the diffusion cover comprises a first portion covering a surface of the light-guide member along an imaginary plane surface orthogonal to an annular center axis of the light-guide member; and a second portion covering a side face of the light-guide member which is located in a direction along the annular center axis.

Also, in one of the preferred aspects of the present invention, at a portion which is a reverse face of the plate-shaped base portion of the diffusion cover, and positioned between the incidence portion of the light-guide member and the circular portion, there is formed a partition portion forming a rib shape.

In that case, furthermore, in one of the preferred aspects of the present invention, the light-guide member comprises an arc-shaped portion along an arc of an imaginary circle; a straight portion parallel to an imaginary straight line passing through the center of the imaginary circle and outside the imaginary circle; and a corner portion positioned between both portions. The partition portion of the diffusion cover comprises a bent portion having a shape matched to the corner portion.

Also, in one of the preferred aspects of the present invention, the partition portion of the diffusion cover comprises a first wall portion extending in a direction intersecting in a protruding direction of the plate-shaped base portion from the circular portion; and a second wall portion connecting a terminal of the first wall portion and the second portion of the circular portion.

Effect of the Invention

According to the present invention, in the illumination device forming a circular luminescent portion by the light-guide member with the annular shape by entering the light into the light-guide member from one portion, the difference in brightness between the incidence portion side of the light and the other portion can be made as little as possible with a simple structure of an easy assembly.

BEST MODES OF CARRYING OUT THE INVENTION

Hereinafter, based on FIG. 1 to FIG. 16, typical embodiments of the present invention will be explained. An illumination device according to the present embodiments includes a light-guide member 1 having an annular shape to form a circular luminescent portion in one portion of various articles by the light-guide member 1.

In illustrated examples, there are shown examples wherein such an illumination device comprises a cup holding member 4 of a cup holder used as an interior part for an automobile and the like. In the illustrated examples, the cup holding member 4 having a disk shape comprises a circular hole 40, and a beverage container is received in the hole 40 from a bottom side thereof to be held therein. In the illumination device, an entire periphery of a marginal portion of the hole 40 of the cup holding member 4 is illuminated so as to enhance a design property of the cup holder, and even at night and the like, the beverage container can be housed in the hole 40 of the cup holding member 4 from the bottom side thereof unmistakably.

Such illumination device comprises the light-guide member 1 and a diffusion cover 2. In the illustrated examples, such light-guide member 1 and diffusion cover 2 are housed between a lower plate 41 and an upper plate 42 forming the cup holding member 4 in a sandwich manner to be incorporated in such cup holding member 4.

The light-guide member 1 forms the annular shape provided with an incidence portion 10 of a light in one portion, and illuminates the entirety by propagating an incident light. Such light-guide member 1 is only required to have a function of transmitting a light and illuminating the entirety by propagating the entered incident light, and can be formed by a heretofore known light transmitting material having such a function.

In the illustrated examples, the light-guide member 1 comprises an arc-shaped portion 11 along an arc of an imaginary circle (not shown in the drawings); a straight portion 12; and two arm portions 13 and 13 connecting the arc-shaped portion 11 and the straight portion 12. The light-guide member 1 comprises a front surface 14 and a reverse face 15 along an imaginary plane surface orthogonal to an annular center shaft thereof (not shown in the drawings); an inside face 16 located in a direction along the annular center shaft; and an outside face 17 located on a side opposite to the inside face 16. The light-guide member 1 is formed such that a cross-sectional shape thereof has a substantially square shape in any position.

Figure 1:
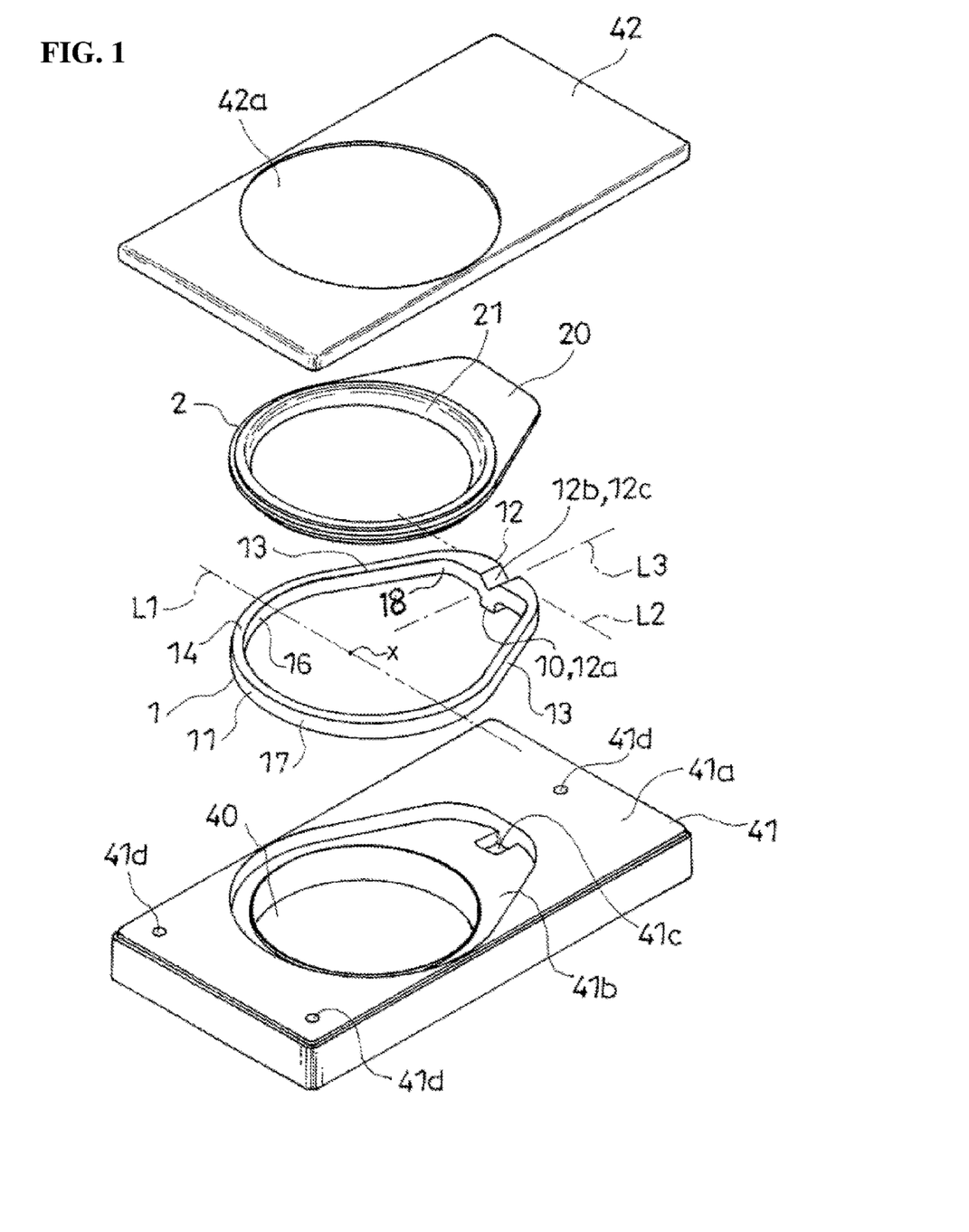
FIG. 1 is an exploded perspective view of a cup holding member including an illumination device according to one embodiment of the present invention.
Figure 2:
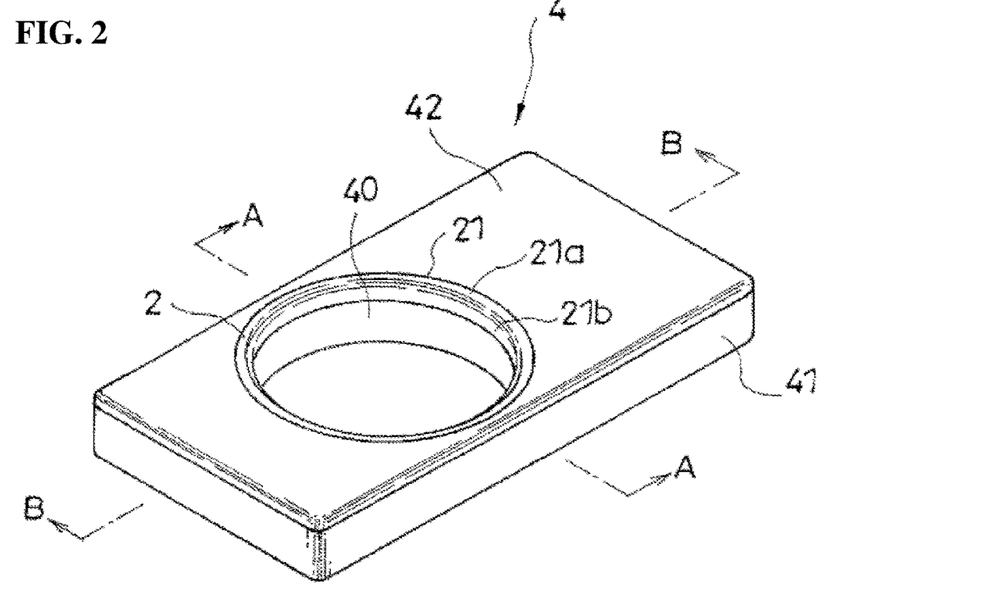
FIG. 2 is a perspective view of the cup holding member.
Figure 3:
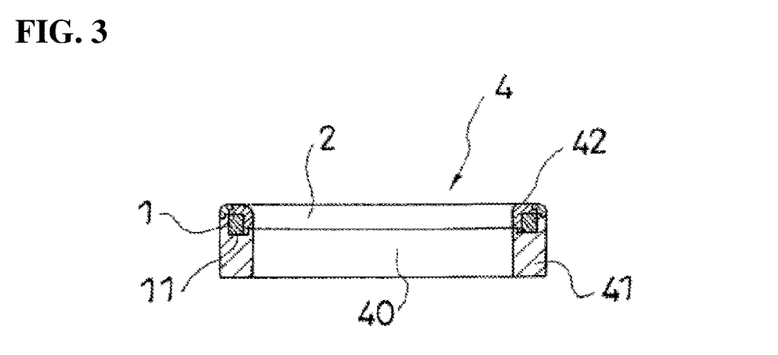
FIG. 3 is a cross-sectional view taken along a line A-A in FIG. 2.

As shown in FIG. 1, the straight portion 12 is formed to follow an imaginary second straight line L2 which is parallel to an imaginary first straight line L1 passing through a center x of the imaginary circle outside the imaginary circle. A total length of the straight portion 12 is shorter than a diameter of the imaginary circle. The incidence portion 10 is formed at a position which is nearly in the middle in a length direction of the straight portion 12. Specifically, on a reverse face 15 side of the light-guide member 1, a projecting end face of a pedestal-like projecting portion 12a projecting from the straight portion 12 functions as the incidence portion 10. On the front surface 14 side of the light-guide member 1 and a position located just above the incidence portion 10, there is formed a V-shaped groove 12b along an imaginary third straight line L3 orthogonal to the second straight line L2. The incident light entered from the incidence portion 10 is reflected by a groove wall 12c of the V-shaped groove 12b, and is propagated in the arc-shaped portion 11 through the arm portions 13.

The light-guide member 1 includes two arm portions 13 and 13. One of the two arm portions 13 and 13 connects one end of the straight portion 12 and one end of the arc-shaped portion 11, and the other of the two arm portions 13 and 13 connects the other end of the straight portion 12 and the other end of the arc-shaped portion 11. The arc-shaped portion 11 has a total length along a range exceeding 180 degrees of the arc of the imaginary circle, and a distance between both ends thereof is set to be shorter than the diameter of the imaginary circle, and longer than a total length of the straight portion 12. Therefore, a distance between the two arm portions 13 and 13 has a structure of being gradually reduced as it approaches the straight portion 12.

Namely, in the present embodiments, the light-guide member 1 comprises a corner portion 18 between the arc-shaped portion 11 and the straight portion 12 (FIG. 1).

The diffusion cover 2 is disposed on a side different from a light source 3 relative to the incidence portion 10, and in the present embodiments, on a side opposite to such light source 3, and is disposed on the side opposite to the light source 3 relative to the incidence portion 10 by placing the light-guide member 1 therebetween so as to diffuse a light generated from the light-guide member 1. (FIG. 3 and FIG. 4) Such diffusion cover 2 is formed by a heretofore known material which transmits the light, but makes the transmitted light become an even and uniform light, i.e., a diffusion light. Typically, such diffusion cover 2 is a milky white.

Such diffusion cover 2 comprises a plate-shaped base portion 20 covering the incidence portion 10 side in the light-guide member 1 at least from the surface 14 side of the light-guide member 1; and a circular portion 21 covering the remaining portions of the light-guide member 1 at least from the surface 14 side by integrating an outer peripheral portion into the plate-shaped base portion 20. In the plate-shaped base portion 20, there is no hole penetrating in a front-and-rear direction and the like, and the plate-shaped base portion 20 has a structure covering the incidence portion 10 side of the light-guide member 1 from the surface 14 side tightly.

In the illustrated examples, the circular portion 21 has a circular shape along the arc of the imaginary circle. Such circular portion 21 comprises a first portion 21a covering the surface 14 of the light-guide member 1 along the imaginary plane orthogonal to the annular center axis of the light-guide member 1; and a second portion 21b covering a side face of the light-guide member 1 which is located in the direction along the annular center axis. In the illustrated examples, a cross section of the circular portion 21 has an L shape by such first portion 21a and second portion 21b. An external diameter of the second portion 21b is approximately identical to the diameter of the imaginary circle, and in the illustrated examples, the second portion 21b covers the inside face 16 of the arc-shaped portion 11 of the light-guide member 1 throughout the whole inside face 16, and the first portion 21a covers the surface 14 of the arc-shaped portion 11 of the light-guide member 1 throughout the whole surface 14.

In the illustrated examples, the plate-shaped base portion 20 comprises an arc-shaped side 20a along the arc of the imaginary circle; a straight side 20b having a length approximately the same as that of the straight portion 12 of the light-guide member 1; and two lateral sides 20c and 20c between the arc-shaped side 20a and the straight side 20b, and the two lateral sides 20c and 20c become sloping sides gradually reducing a width of the plate-shaped base portion 20 as approaching the straight portion 12, respectively. On the surface 14 side of the light-guide member 1, the two arm portions 13 and the straight portion 12 are covered by the plate-shaped base portion 20.

In the first example shown in FIG. 1 to FIG. 10, at a portion which is a reverse face 20d of the plate-shaped base portion 20 of the diffusion cover 2, and is positioned between the incidence portion 10 of the light-guide member 1 and the circular portion 21, there is formed a partition portion 20e forming a rib shape. Also, such partition portion 20e comprises a first wall portion 20f extending in a direction intersecting in a protruding direction y (see FIG. 10) of the plate-shaped base portion 20 from the circular portion 21; and second wall portions 20g connecting terminals of the first wall portion 20f and the second portion 21b of the circular portion 21.

In the first example, the plate-shaped base portion 20 forms a plate shape continuing into the first portion 21a of the circular portion 21, and comprises the partition portion 20e on the reverse face 20d thereof. A protruding end 20h of the partition portion 20e is located on a plane where a protruding end 21c of the second portion 21b of the circular portion 21 is located. In the first example, the first wall portion 20f of the partition portion 20e is parallel to the straight side 20b of the plate-shaped base portion 20. The first wall portion 20f contacts an outer face thereof with the inside face 16 of the straight portion 12 of the light-guide member 1 to cover this. Also, the second wall portion 20g contacts an outer face thereof with the inside face 16 of the arm portion 13 of the light-guide member 1 to cover this. Namely, the second portion 21b of the circular portion 21 and the partition portion 20e of the plate-shaped base portion 20 in the diffusion cover 2 have an outline shape approximately equal to an outline shape of the inside face 16 of the light-guide member 1. Also, outer edges of the circular portion 21 and the plate-shaped base portion 20 are positioned in an outside more than the outer faces of 20f, 20g, and 21b for a size covering the surface 14 of the light-guide member 1. In the first example, outside the arc-like side 20a of the plate-shaped base portion 20, there is formed an arc-like wall 20j facing an inner face side of the first wall portion 20f, and a portion surrounded by the arc-like side 20a, the arc-like wall 20j, and two second wall portions 20g becomes a thick wall portion 20i increasing a front and rear size of the plate-shaped base portion 20. Thereby, in the first example, a light emitted toward an annular center axis side of the light-guide member 1 from the inside face 16 of the straight portion 12 of the light-guide member 1 is diffused by the first wall portion 20f and such thick wall portion 20i. Also, there are formed bent portions 20r having a shape matching to corner portions 18 (see FIG. 1) of the light-guide member 1 between the first wall portion 20f and the second wall portion 20g. The bent portions 20r contact the corner portions 18 of the light-guide member 1 to cover them.

Figure 11:
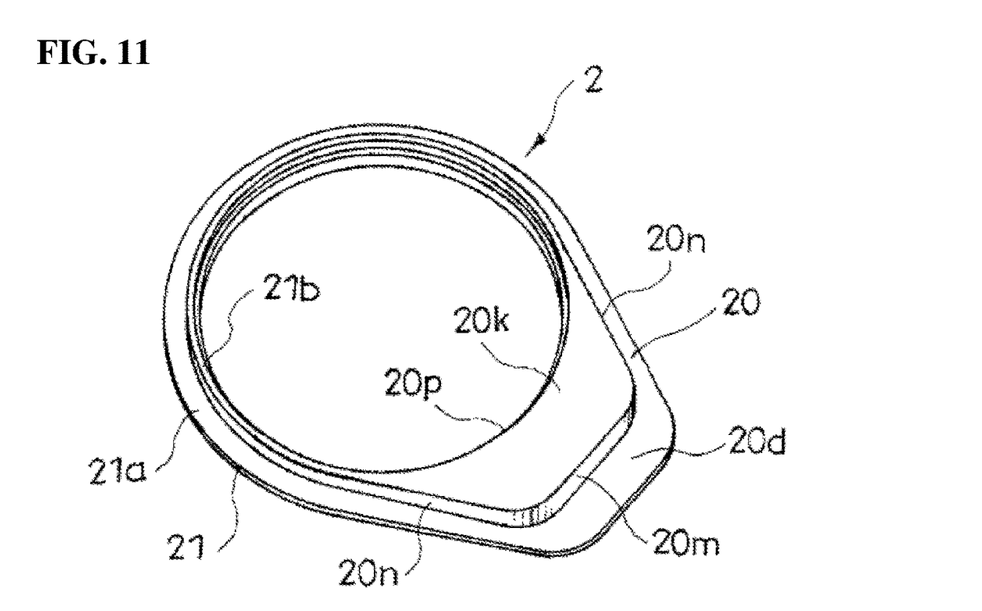
FIG. 11 is a perspective view of a structural example (second example) of the diffusion cover forming the illumination device.

FIG. 11 shows a second example of the diffusion cover 2 wherein on the reverse face 20d of the plate-shaped base portion 20, there are provided a first outer face 20m contacting with the inside face 16 of the straight portion 12 of the light-guide member 1, and a second outer face 20n contacting with an inner face of the arm portion 13 of the light-guide member 1; and there is formed a thick wall portion 20k integrating a portion 20p facing the first outer face 20m into the second portion 21b of the circular portion 21. A light emitted toward the annular center axis side of the light-guide member 1 from an inner face of the straight portion 12 of the light-guide member 1 is diffused by the thick wall portion 20k.

Figure 12:
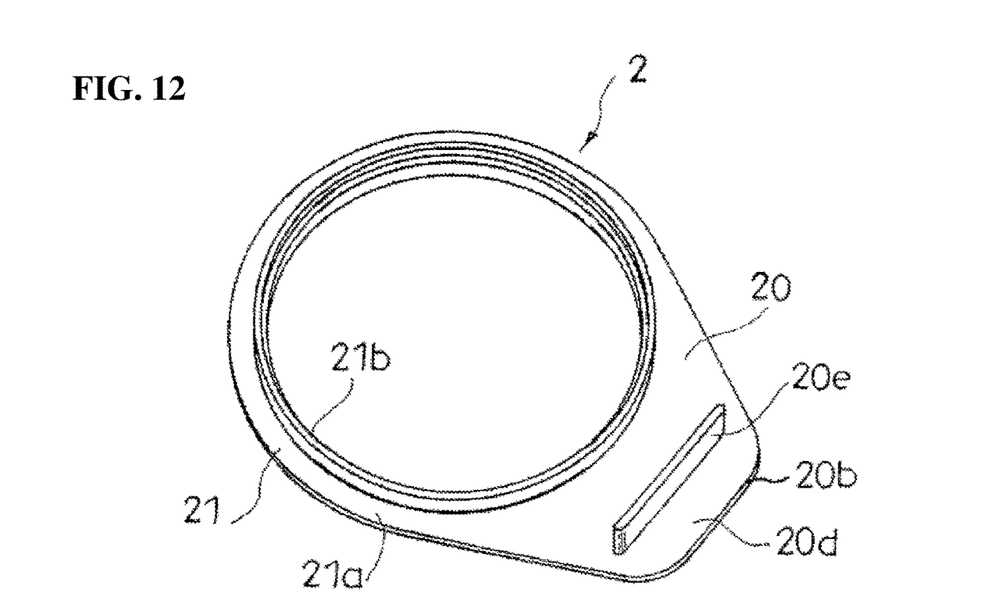
FIG. 12 is a perspective view of a structural example (third example) of the diffusion cover forming the illumination device.

FIG. 12 shows a third example of the diffusion cover 2 wherein on the reverse face 20d of the plate-shaped base portion 20, there is provided only the partition portion 20e forming the rib shape parallel to the straight side 20b of the plate-shaped base portion 20, and the partition portion 20e contacts the inner face of the straight portion 12 of the light-guide member 1.

Figure 13:
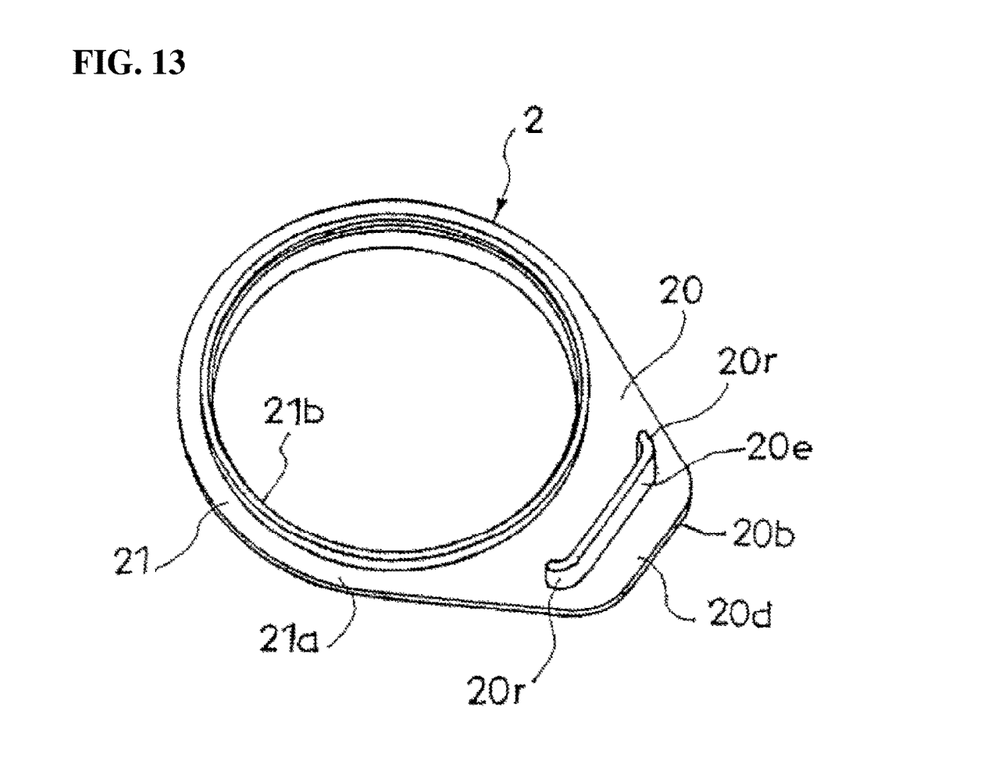
FIG. 13 is a perspective view of a structural example (fourth example) of the diffusion cover forming the illumination device.

FIG. 13 shows a fourth example of the diffusion cover 2 wherein the partition portion 20e provided on the reverse face 20d of the plate-shaped base portion 20 comprises a portion forming a rib shape which is parallel to the straight side 20b of the plate-shaped base portion 20; and the bent portions 20r having the shape matching to the corner portions 18 of the light-guide member 1, and the partition portion 20e contacts the inner face of the straight portion 12 and inner faces of the corner portions 18 of the light-guide member 1. At the corner portion 18, a light entering into the light-guide member 1 from the incidence portion 10 concentrates so as to have high luminance; however, the light at the corner portion 18 can be effectively diffused by the bent portion 20r covering the corner portion 18.

Figure 14:
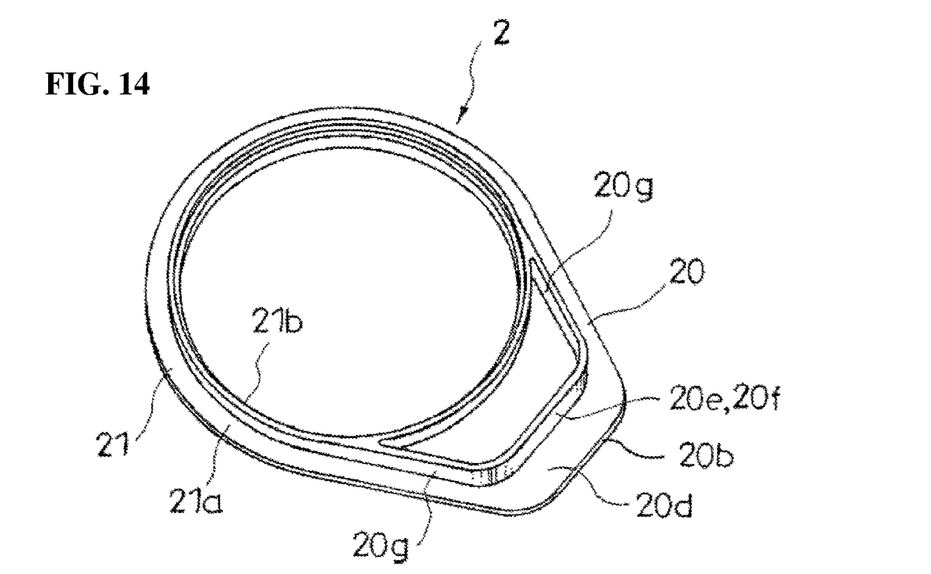
FIG. 14 is a perspective view of a structural example (fifth example) of the diffusion cover forming the illumination device.

FIG. 14 shows a fifth example of the diffusion cover 2 wherein on the reverse face 20d of the plate-shaped base portion 20, there are provided the first wall portion 20f parallel to the straight side 20b of the plate-shaped base portion 20; and the second wall portions 20g connecting the terminals of the first wall portion 20f and the second portion 21b of the circular portion 21, and the outer face of the first wall portion 20f contacts the inside face 16 of the straight portion 12 of the light-guide member 1, and the outer face of the second wall portion 20g contacts the inside face 16 of the arm portion 13 of the light-guide member 1. In the fifth example, the thick wall portion 20i as in the first example is not provided.

Figure 15:
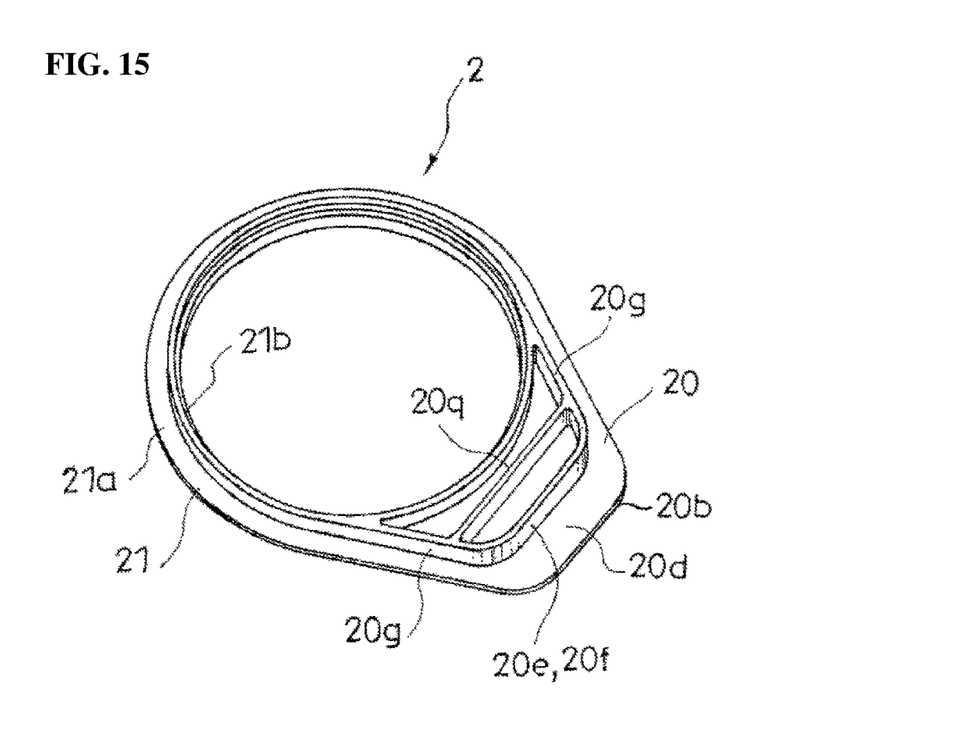
FIG. 15 is a perspective view of a structural example (sixth example) of the diffusion cover forming the illumination device.

FIG. 15 shows a sixth example of the diffusion cover 2 wherein on the reverse face 20d of the plate-shaped base portion 20, there are provided the first wall portion 20f parallel to the straight side 20b of the plate-shaped base portion 20; the second wall portions 20g connecting the terminals of the first wall portion 20f and the second portion 21b of the circular portion 21; and an additional rib-like portion 20q ranging between the two second wall portions 20g and 20g between the circular portion 21 and the first wall portion 20f, and the outer face of the first wall portion 20f contacts the inner face of the straight portion 12 of the light-guide member 1, and the outer face of the second wall portion 20g contacts the inner face of the arm portion 13 of the light-guide member 1.

As shown in FIG. 1, on a surface 41a of the lower plate 41 forming the cup holding member 4, there is formed a concave portion 41b following an outline shape of the light-guide member 1, and the hole 40 of the cup holding member 4 is formed inside the concave portion 41b. Inside the concave portion 41b, there is formed a through hole 41c in which the incidence portion 10 of the light-guide member 1 is housed, and the light source 3 forming the illumination device is fitted to the through hole 41c from a reverse face side of the lower plate 41. (See FIG. 4) In the illustrated example, such light source 3 is an LED.

Figure 4:
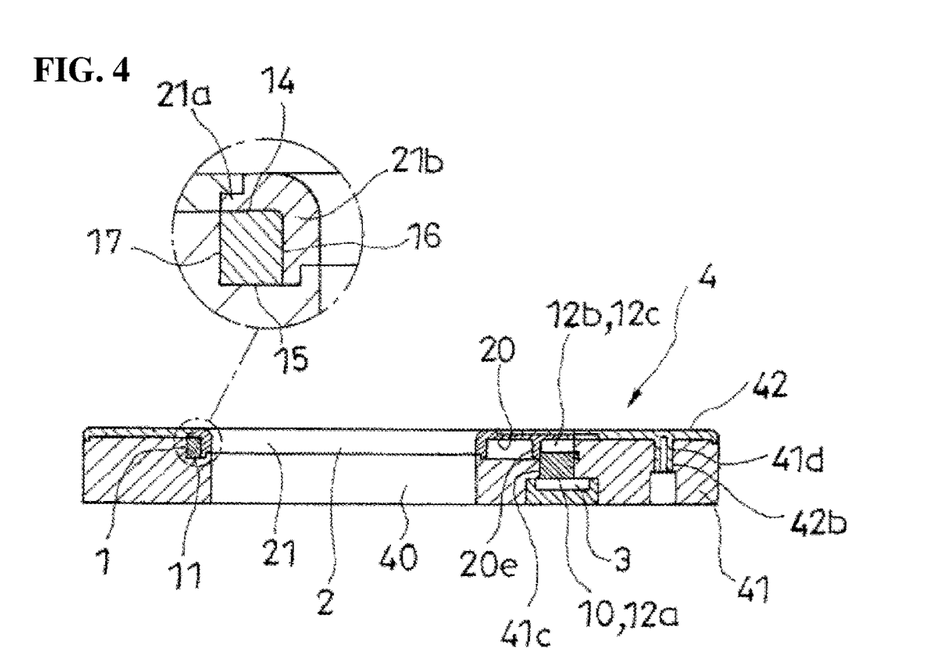
FIG. 4 is a cross-sectional view taken along a line B-B in FIG. 2, and a partially enlarged cross-sectional view.
Figure 5:
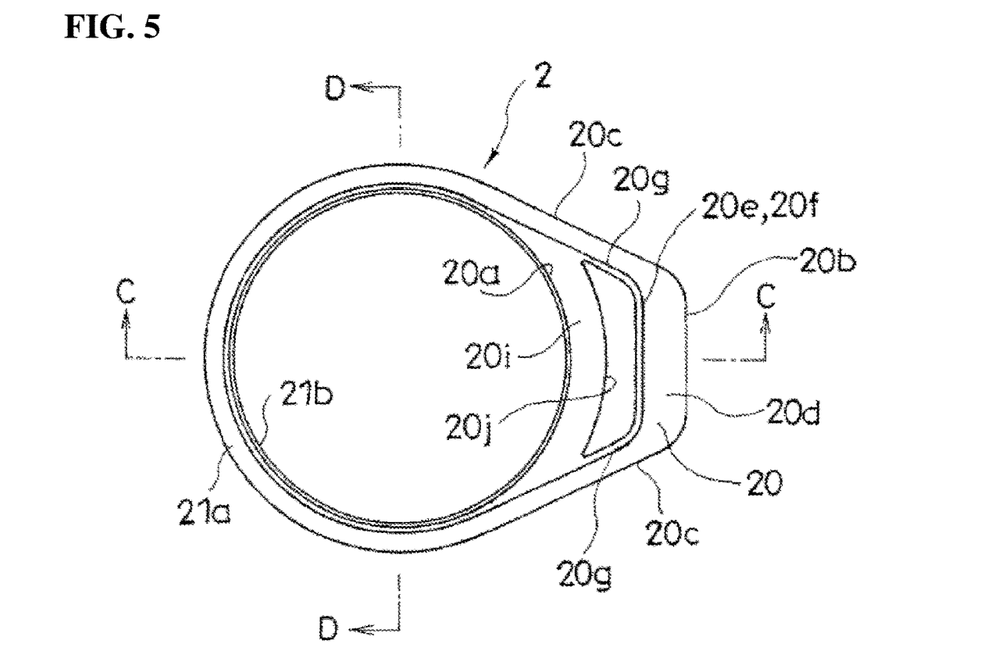
FIG. 5 is a bottom view of a structural example (first example) of a diffusion cover forming the illumination device.
Figure 6:
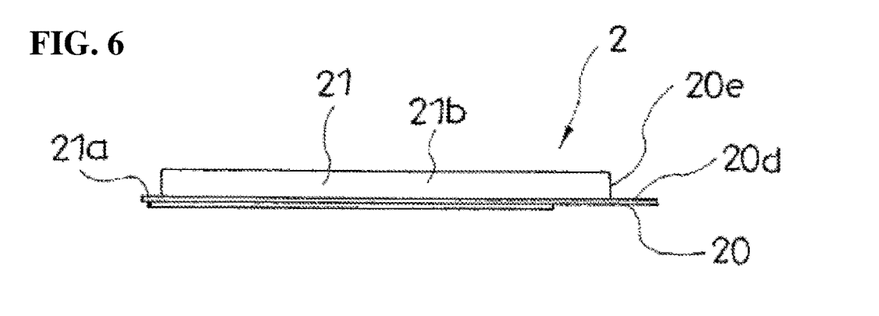
FIG. 6 is a side view of the first example of the diffusion cover.
Figure 7:
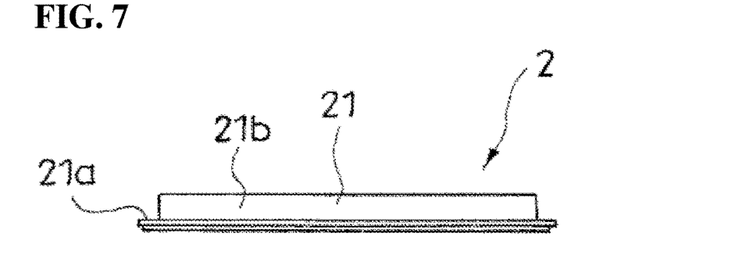
FIG. 7 is a side view of the first example of the diffusion cover, and shows the diffusion cover from a different direction of 90 degrees from FIG. 6.
Figure 8:
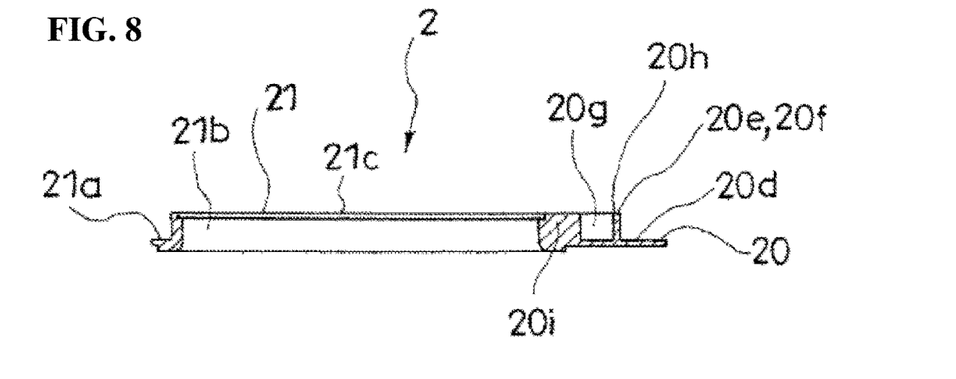
FIG. 8 is a cross-sectional view taken along a line C-C in FIG. 5.
Figure 9:
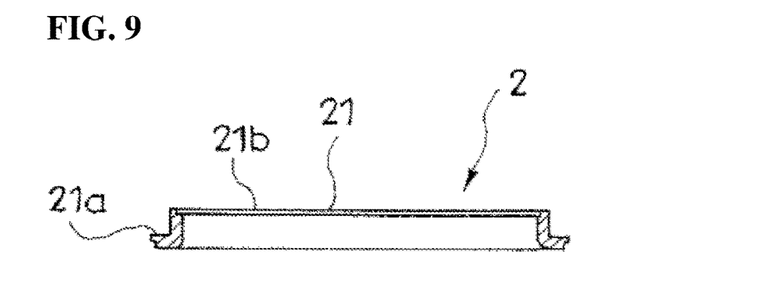
FIG. 9 is a cross-sectional view taken along a line D-D in FIG. 5.
Figure 10:
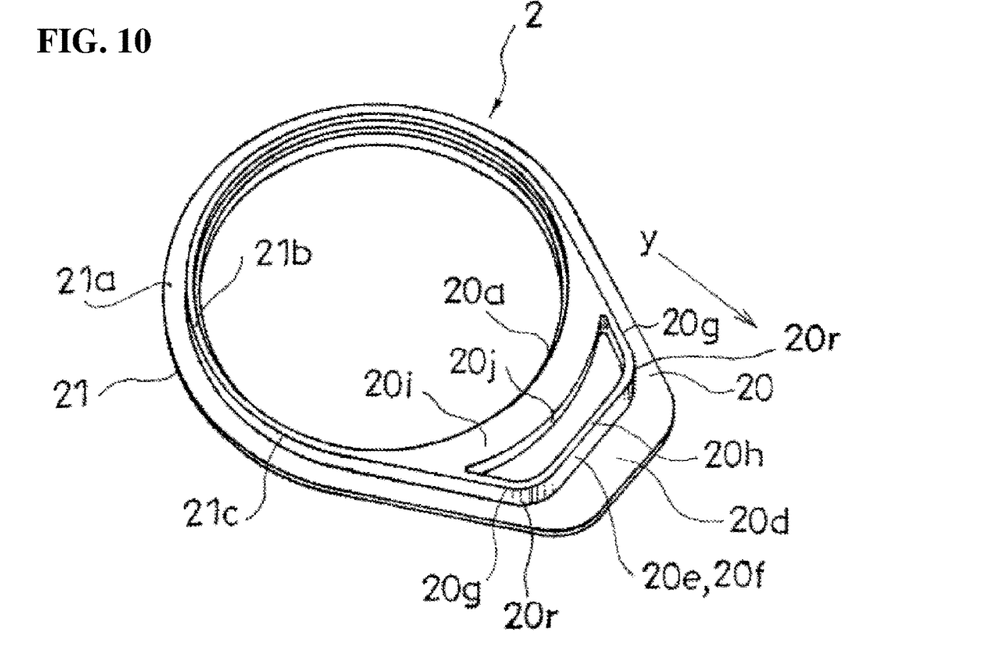
FIG. 10 is a perspective view of the first example of the diffusion cover.

In the illustrated example, after the light-guide member 1 is housed in the concave portion 41b of the lower plate 41 having a complementary shape to the outline shape of the light-guide member 1, the second portion 21b of the circular portion 21 enters an inside of the arc-shaped portion 11 of the light-guide member 1, and the diffusion cover 2 is additionally installed in such a way as to cover the straight portion 12 of the light-guide member 1 and the arm portions 13 with the plate-shaped base portion 20. An internal diameter of the second portion 21b of the circular portion 21 of the diffusion cover 2 is identical to a diameter of the hole 40 of the cup holding member 4. In the upper plate 42, there is formed a hole 42a which is larger than the diameter of the hole 40 of the cup holding member 4, and is slightly smaller than an external diameter of the circular portion 21 of the diffusion cover 2, and from a state wherein the diffusion cover 2 is additionally installed as mentioned above, the upper plate 42 is additionally installed on the surface 41a of the lower plate 41 in such a way as to communicate the hole 42a of the upper plate 42 with the hole 40 of the cup holding member 4, so that the illumination device is incorporated in the cup holding member 4. In FIG. 4, a sign 42b represents a boss portion formed on a reverse face side of the upper plate 42, and from a state wherein the boss portion 42b is inserted into a receiving hole 41d of the boss portion 42b formed in the lower plate 41, a tapping screw (not shown in the drawings) is screwed in the boss portion 42b from the reverse face side of the lower plate 41, so that the upper plate 42 and the lower plate 41 are combined in a state of sandwiching the illumination device therebetween.

In a case wherein the light simply enters the light-guide member 1 having the annular shape from one portion to illuminates the entirety of the light-guide member 1, the incidence portion 10 brightens, and the entirety of the light-guide member 1 cannot be illuminated uniformly; however, according to the diffusion cover 2, the light on the incidence portion 10 side is effectively diffused, so that the circular portion 21 of the diffusion cover 2 can be illuminated with uniform brightness as much as possible in any position thereof. In the illustrated examples, the circular portion 21 of the diffusion cover 2 can light up the hole of the cup holding member 4 with uniform brightness at each position in an annular direction thereof.

Figure 16:
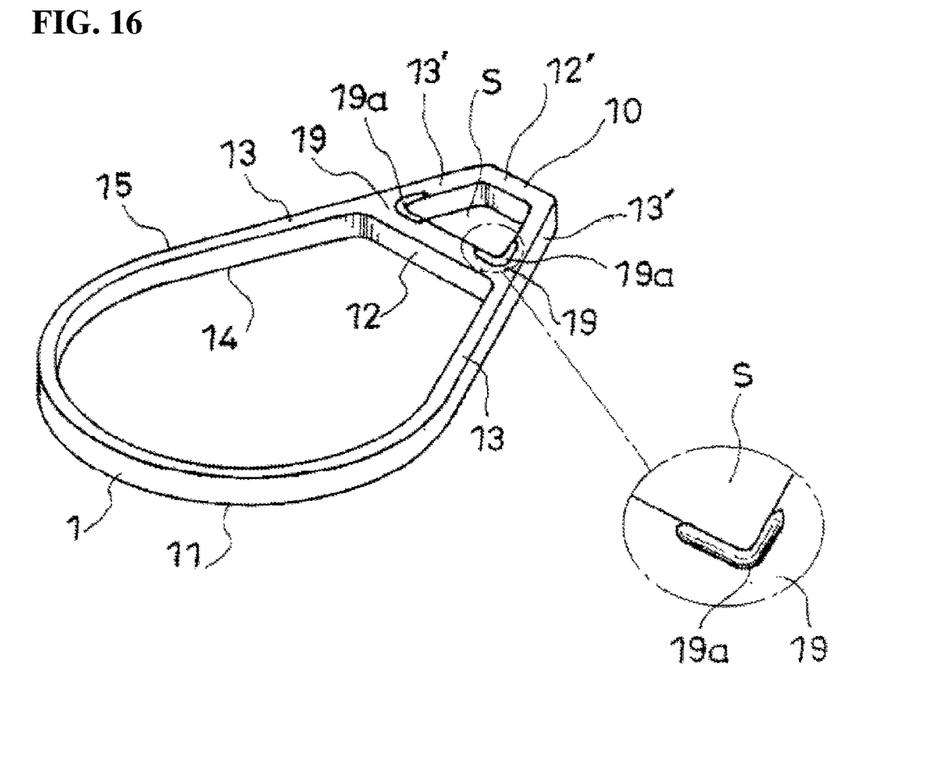
FIG. 16 is a perspective view of another structural example of a light-guide member forming the illumination device, and a partially enlarged perspective view, and shows such light-guide member seen from a reverse face side thereof.

Incidentally, as shown in FIG. 16, in a case wherein the light-guide member 1 has a structure comprising the arc-shaped portion 11; the straight portion 12; an outside straight portion 12' disposed parallel to the straight portion 12 by opening a space s between the outside straight portion 12' and the straight portion 12 outside the straight portion 12; and outside arm portions 13' connecting the straight portion 12 and the outside straight portion 12', and the incidence portion 10 is provided in the outside straight portion 12', it is preferable that ribs 19a are provided at corner portions 19 which are on the reverse face 15 of the light-guide member 1 and are between the outside arm portions 13' and the straight portion 12 in such a way as to border marginal portions on the space s side in the corner portions 19. In such a case, the light entered into the light-guide member 1 by the incidence portion 10 can be effectively wrapped around to the straight portion 12 by such ribs 19a.

Incidentally, obviously, the present invention is not limited to the above-explained embodiments, and includes all embodiments which can obtain the object of the present invention.

Incidentally, all contents of the specification, claims, drawings, and abstract of Japanese Patent Application No. 2013-193367 filed on Sep. 18, 2013 are cited in their entireties herein and are incorporated as a disclosure of the specification of the present invention.

What is claimed is:

1. An illumination device, comprising:
a light-guide member having an annular shape, and illuminating an entirety by propagating an incident light, the light-guide member including an arc shaped portion, two arm portions extending from the arc-shaped portion, a straight portion connecting the two arm portions, a projecting portion projecting from a reverse side of the straight portion and receiving a light from a light source, and a V-shape groove located in the straight portion above the projecting portion so that incident light entered from the incidence portion is reflected by a groove wall of the V-shaped groove, and is propagated in the arc-shaped portion through the arm portions; and
a diffusion cover disposed on the light-guide member at a side opposite to the light source relative to the incidence portion, and diffusing the light generated from the light-guide member, the diffusion cover including
a plate-shaped base portion covering the incidence portion in the light-guide member,
a circular portion covering a remaining portion of the light-guide member and integrally fixed to an outer peripheral portion of the plate-shaped base portion, and
a partition portion having a rib shape and located on the plate-shaped base portion at a side facing the light-guide member and at a position between the projecting portion of the light-guide member and the circular portion, the partition portion including a first wall portion extending in a direction intersecting a protruding direction of the plate-shaped base portion from the circular portion to diffuse the light by the partition portion.

2. An illumination device according to claim 1, wherein the circular portion of the diffusion cover includes
a first portion covering a surface of the light-guide member along an imaginary plane surface orthogonal to an annular center axis of the light-guide member; and
a second portion covering a side face of the light-guide member which is located on a side along the annular center axis.

3. An illumination device according to claim 2, wherein the light-guide member includes a corner portion positioned between the arc-shaped portion and the straight portion, and
the partition portion of the diffusion cover includes a bent portion having a shape matching the corner portion.

4. An illumination device according to claim 2, wherein the partition portion of the diffusion cover further includes a second wall portion connecting an end of the first wall portion and a portion of the circular portion.

5. An illumination device according to claim 1, wherein the partition portion is arranged between the light source and the circular portion.

6. An illumination device according to claim 5, wherein the diffuser cover further includes a wall portion on the reverse face of the plate-shaped base portion, the wall portion extending in the protruding direction from the circular portion to the partition portion so that the wall portion has a thickness in the protruding direction thicker than the first portion of the circular portion covering a side face of the light-guide member to diffuse the light toward the circular portion.

7. An illumination device according to claim 5, wherein the diffusion cover further includes an arc shape wall between the first wall portion and the circular portion, and a portion between the arc shape wall and the first wall is recessed.

8. An illumination device according to claim 1, wherein the partition portion further includes two second wall portions, each second wall portion extending from each end of the first wall portion to connect to the circular portion.

9. An illumination device according to claim 1, further comprising a lower plate disposed under the light-guide member and having a hole for receiving a cup therein, a concave portion formed around the hole to receive the light-guide member therein, and a through hole at one portion of the concave portion in which the projecting portion of the light-guide member is disposed, the diffusion cover covering the lower plate and the light-guide member.

10. An illumination device according to claim 9, wherein the light-guide member has an inside face so that when the light-guide member is disposed in the concave portion, a part of the inside face is located above the concave portion and is covered by the diffusion cover.

\* \* \* \* \*